US012693440B2

(12) United States Patent
Kitayama et al.

(10) Patent No.: US 12,693,440 B2
(45) Date of Patent: Jul. 28, 2026

(54) RADIATION DETECTION DEVICE

(71) Applicants:JAPAN ATOMIC ENERGY AGENCY, Naka (JP); TOHOKU UNIVERSITY, Sendai (JP)

(72) Inventors: Yoshiharu Kitayama, Naka-gun (JP); Keitaro Hitomi, Sendai (JP); Mitsuhiro Nogami, Sendai (JP)

(73) Assignees: JAPAN ATOMIC ENERGY AGENCY, Naka-gun (JP); TOHOKU UNIVERSITY, Sendai (JP)

( * ) Notice: Subject to any disclaimer, the term of this patent is extended or adjusted under 35 U.S.C. 154(b) by 106 days.

(21) Appl. No.: 18/410,450

(22) Filed: Jan. 11, 2024

(65) Prior Publication Data

US 2024/0248219 A1      Jul. 25, 2024

(30) Foreign Application Priority Data

Jan. 20, 2023    (JP) ................................. 2023-007015

(51) Int. Cl.
    *G01T 1/29*        (2006.01)
    *G01T 7/00*        (2006.01)
    *G06T 12/20*       (2026.01)
(52) U.S. Cl.
    CPC .......... G01T 1/2985 (2013.01); G01T 1/2992 (2013.01); G01T 7/00 (2013.01); G06T 12/20 (2026.01)
(58) Field of Classification Search
    CPC ...... G01T 1/2985; G01T 1/2992; G01T 1/164
    See application file for complete search history.

(56) References Cited

U.S. PATENT DOCUMENTS

2022/0268953 A1      8/2022   Behar et al.

OTHER PUBLICATIONS

Muraishi et al., "Shift-invariant gamma-ray imaging by adding a detector rotation function to a high-sensitivity omnidirectional Compton camera,", Japanese Journal of Applied Physics 59, 090911 (Year: 2020).*
Takara Watanabe et al 2018 Jpn. J. Appl. Phys. 57 026401. (Year: 2018).*

(Continued)

*Primary Examiner* — Casey Bryant
(74) *Attorney, Agent, or Firm* — Lucas & Mercanti, LLP

(57) ABSTRACT

A radiation detection device is provided that is wide in visual field, wide in application range of radiation energy, and which is smaller and lighter in weight as compared to other devices. The device includes a detecting element group has a plurality of detecting elements that detect radiation are three-dimensionally arranged. The detecting element group has a structure with a depletion formed by removing the detecting element at any position from a virtual detecting element group in which the detecting elements are laid out on any virtual surface. The depletion is provided at a position at which a difference of detected values between one detecting element and another detecting element arranged along any direction exhibits different values in a case where the radiation having the direction as an incident direction enters and a case where the radiation having an opposite direction of the direction as an incident direction enters.

8 Claims, 12 Drawing Sheets

(56) References Cited

OTHER PUBLICATIONS

Vacheret et al., "nFacet 3D Sensitive Neutron Detection for Timely Source Localisation and Identification", NuSec Workshop University of Surrey, 2019, pp. 1-23.

Kitayama et al., "Investigation of Omnidirectional Imaging Technology Using Gamma-ray Three-Dimensional Shadows, Feasibility Study on 4 pi Imaging Using Three-Dimensional Shadows of Gamma Rays", 83rd Session of Applied Physics Society Autumn Scientific Lecture Lecture Speech, 2022, 1 page, English translation 1 page.

Office Action issued on Jun. 2, 2026 for the corresponding Japanese patent application No. 2023-007015, 7 pages.

* cited by examiner

P5 : 0 degree

P6 : 225 degree

RADIATION DETECTION DEVICE

CROSS REFERENCE TO RELATED APPLICATIONS

This application claims the benefit of priority from Japanese Patent Application No. 2023-007015, filed Jan. 20, 2023, the contents of which are incorporated herein by reference.

TECHNICAL FIELD

The present invention relates to a radiation detection device.

BACKGROUND OF THE INVENTION

Radiation detection devices such as a gamma-ray imager that detects and visualizes radiation, such as a gamma ray are known. Typical examples include a Compton camera, a pinhole camera, or a camera of coded mask type.

The Compton camera requires ONE to match detection timings of signals (make a coincidence) between two different detecting elements. Therefore, application of the Compton camera is difficult when the signal detection rate is too high to keep up the process. Since the Compton camera requires a considerably large number of detecting elements, the circuit is complicated, and the price is high. For the Compton camera, a product with a visual field in which a solid angle is in a range of $2\pi$ sr or less in the front of the camera is common, and when the product is used, it is necessary to perform a measurement multiple times or use a plurality of Compton cameras for radiation detection and imaging in all directions (solid angle is $4\pi$ sr).

Since the pinhole camera requires a heavy and large-sized shield of lead, tungsten, or the like, the weight of the device exceeds tens of kilograms. Carrying the pinhole camera is not easy, and the pinhole camera it is not practical to mount it to a small-sized search robot. Furthermore, since the pinhole camera detects only radiation that has passed through a small pinhole formed at the shield, the detection sensitivity is low, and the visual field is narrow.

For the coded mask type camera, when events of high energy gamma ray that have passed through the coded mask increase to substantially deteriorate the imaging accuracy, the detectable energy range of radiation is limited. Further, in an environment in which radiation enters from directions other than the front of the detecting element, since the noise increases, the coded mask type camera is not appropriate for use. The coded mask type camera also has a narrow visual field when compared with the Compton camera and the pinhole camera and is not appropriate also for application in radiation detection and imaging in a wide region.

SUMMARY OF THE INVENTION

However, while the radiation detection devices disclosed above can ensure the visual field in all directions, a large number of detecting elements is still necessary, and the weight of the device is heavy. Therefore, the radiation detection devices disclosed above have room for improvement when compared similarly to a conventional radiation detection device, such as a Compton camera.

The present invention has been made in consideration of the circumstances described above and provides a novel radiation detection device that is wide in visual field, wide in application range of radiation energy, and a device which is smaller and lighter in weight.

To solve the above-described problem, a radiation detection device of the present invention is one that includes a detecting element group in which a plurality of detecting elements that detect radiation are three-dimensionally arranged. The detecting element group has a structure provided with a depletion formed by removing the detecting element at any position from a virtual detecting element group in which the detecting elements are laid out on any virtual surface. The depletion is provided at a position at which a difference of detected values between one detecting element and another detecting element arranged along any direction exhibits different values in a case where the radiation having the direction as an incident direction enters and a case where the radiation having an opposite direction of the direction as an incident direction enters.

The present invention can provide a novel radiation detection device that is wide in visual field, wide in application range of radiation energy, and a device which is smaller and lighter in weight.

DETAILED DESCRIPTION

Figure 1:
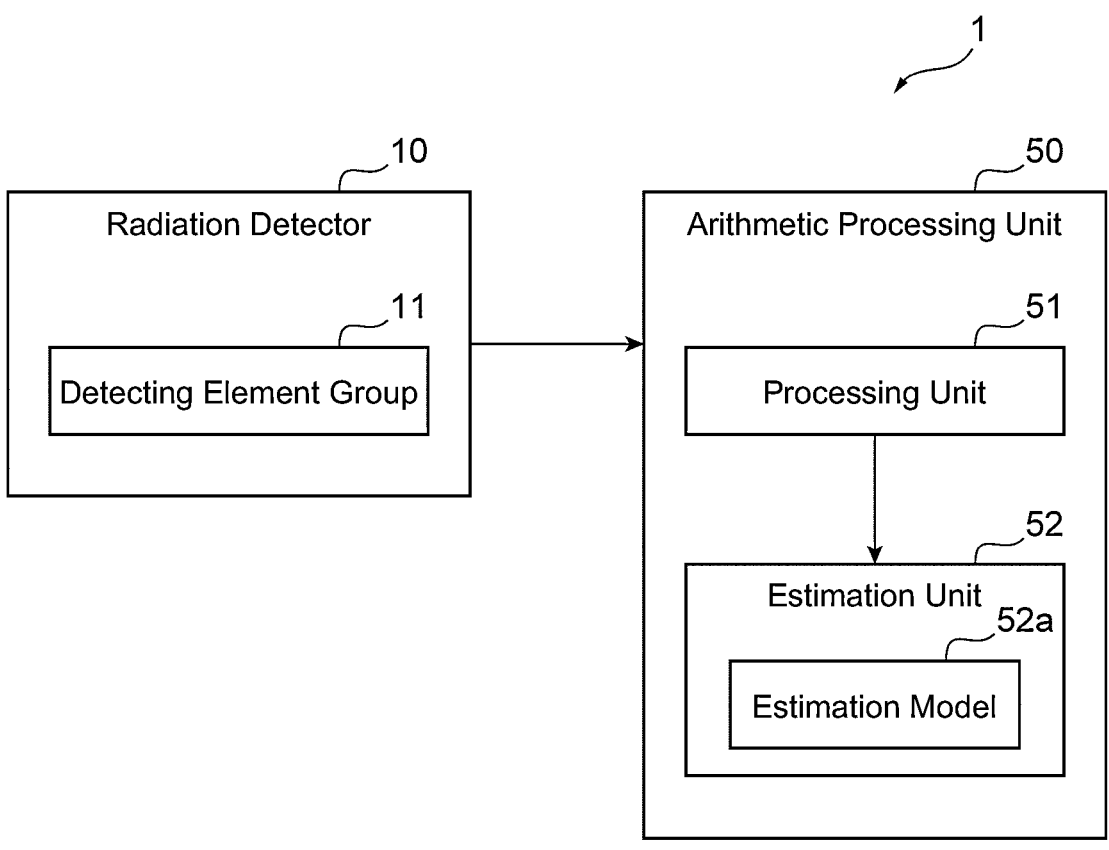
FIG. 1 is a diagram illustrating a configuration of a radiation detection device of the embodiment.

The following describes embodiments of the present invention with reference to the drawings. Configurations to which the same reference numerals are attached in the respective embodiments have similar functions in the respective embodiments insofar as they are not especially mentioned, and their explanations will be omitted.

Figure 2:
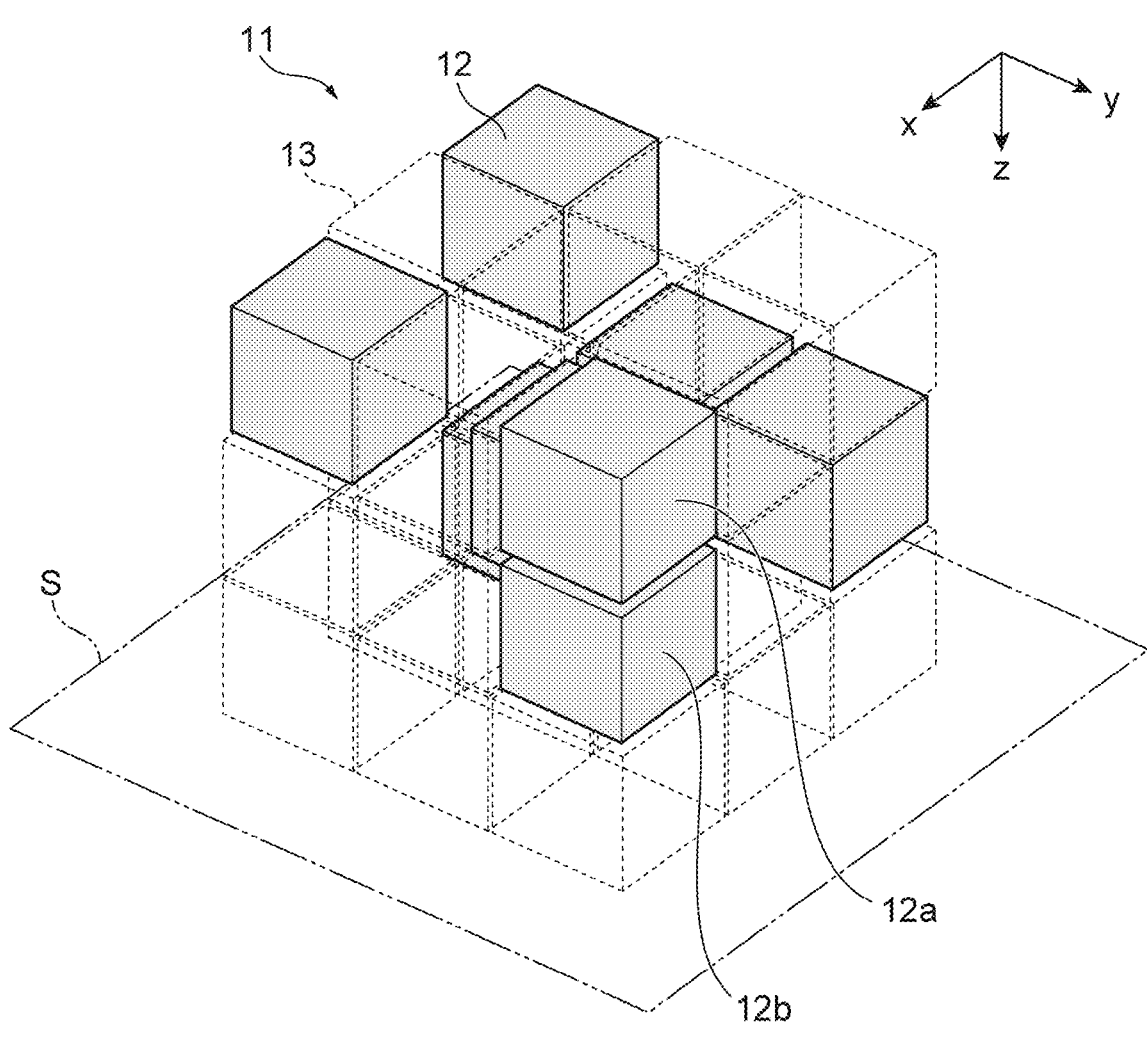
FIG. 2 is a diagram describing a structure of a detecting element group illustrated in FIG. 1.

FIG. 1 is a diagram illustrating a configuration of a radiation detection device 1 of the embodiment. FIG. 2 is a diagram describing a structure of a detecting element group 11 illustrated in FIG. 1.

The radiation detection device 1 is a device that detects and visualizes radiation. The radiation detection device 1 is applicable to a wide radiation energy range from an X-ray of about several keV to a gamma ray of tens of MeV. Further, the radiation detection device 1 is applicable to environments of various dose rates from a low-dose field of about several uSv/h or less to an ultra-high dose field of several Sv/h. For example, the radiation detection device 1 is applicable to a gamma-ray imager used for the investigation of radioactive contamination inside the building of Fukushima Daiichi Nuclear Power Plant, a gamma-ray imager used at an ultra-high dose field, such as a pressure vessel, an X-ray or gamma-ray imager installed in an astronomy satellite, a gamma-ray imager used for an investigation of radioactive contamination in an outdoor environment, a gamma-ray imager installed in medical equipment for radiation therapy, and a detector for nuclear security in a large-scale event or the like.

The radiation detection device 1 includes a radiation detector 10 provided with a detecting element group 11 including a plurality of detecting elements 12 that detect radiation, and an arithmetic processing unit 50 that is connected to the radiation detector 10 and processes a detection result of the radiation detector 10.

The detecting element 12 is not specifically limited insofar as it is an element that can detect radiation as a detection target. When the radiation as the detection target is a gamma ray, for the detecting element 12, various elements, such as a scintillator, a semiconductor-type detecting element, or an integration-type detecting element, may be considered. In this embodiment, a case where the radiation as the detection target is a gamma ray, and the detecting element 12 is a cubic scintillator will be described.

The detecting element group 11 includes a plurality of the detecting elements 12. The plurality of detecting elements 12 constituting the detecting element group 11 are three-dimensionally arranged. The detecting element group 11 has a structure provided with a depletion 13 (space) formed by removing the detecting element 12 at any position from a virtual detecting element group in which the detecting elements 12 are laid out on any virtual surface S. For example, FIG. 2 illustrates the detecting element group 11 in which an outer shape of the detecting element group 11 is formed in a cubic shape. FIG. 2 illustrates an outer surface in the bottom side along an xy-plane as the virtual surface S. In the example of FIG. 2, only one detecting element 12 is disposed for the virtual surface S of the outer surface in the bottom side along the xy-plane, and the detecting elements 12 are not uniformly laid out on the virtual surface S. That is, in the example of FIG. 2, it can be understood that the eight detecting elements 12 are removed from the virtual detecting element group in which the nine detecting elements 12 are laid out in a square shape on the virtual surface S of the outer surface in the bottom side along the xy-plane, thus forming the eight depletions 13.

While only the outer surface in the bottom side along the xy-plane is illustrated as the virtual surface S in the example of FIG. 2, the virtual surface S is defined for the surface other than this outer surface. Although not illustrated in the example of FIG. 2, an outer surface in the top side along the xy-plane, a surface passing between a detecting element 12a and a detecting element 12b along the xy-plane are also defined as the virtual surface S. The virtual surface S can be appropriately defined insofar as the surface is an outer surface of a solid forming the outer shape of the detecting element group 11, or a surface intersecting with the solid. The number of the virtual surfaces S can also be appropriately defined.

The depletion 13 is provided at a position at which a difference of detected values between one detecting element 12a and the other detecting element 12b arranged along any direction intersecting with the outer shape of the detecting element group 11 exhibits different values in a case where the radiation enters from the direction and a case where the radiation enters from an opposite direction of the direction. In the example of FIG. 2, the difference of the detected values between the one detecting element 12a and the other detecting element 12b arranged along a +z-axis direction intersecting with the outer shape of the detecting element group 11 exhibits different values in the case where the radiation having the +z-axis direction as the incident direction enters the detecting element group 11 and the case where the radiation having the −z-axis direction, which is the opposite direction of the +z-axis direction, as the incident direction enters the detecting element group 11.

This allows the detecting element group 11 to have a relative positional relation between a plurality of detecting elements 12 in any incident direction of the radiation as positional relations different in all directions (solid angle is 4πsr). Accordingly, in the detecting element group 11, an intensity distribution of the radiation (specifically, intensity distribution of the radiation flux) in the detecting element group 11 obtained from the respective detected values of the plurality of detecting elements 12 can be provided as distributions different in all directions. In other words, the radiation detection device 1 can actively generate the inclination of the radiation flux intensity that differs corresponding to the radiation incident direction in the detecting element group 11. In the example of FIG. 2, the radiation intensity distribution in the detecting element group 11 when the radiation having the +z-axis direction as the incident direction is detected is a distribution different from the radiation intensity distribution in the detecting element group 11 when the radiation having the −z-axis direction as the incident direction is detected.

The radiation detection device 1 uses the radiation intensity distribution in the detecting element group 11 that differs corresponding to the radiation incident direction to estimate a source location of the radiation. The radiation detection device 1 preliminarily stores information in which the direction from which the radiation enters is associated with the distribution that the radiation intensity distribution in the detecting element group 11 exhibits, and estimates the radiation source location from the radiation intensity distribution acquired in the actual measurement.

Specifically, the arithmetic processing unit 50 of the radiation detection device 1 includes a processing unit 51 that acquires a spatial intensity distribution of the radiation in the detecting element group 11 based on the respective detected values of the plurality of detecting elements 12, and an estimation unit 52 that estimates the source location of the radiation based on the acquisition result of the radiation intensity distribution. The arithmetic processing unit 50 includes a CPU, a ROM, a RAM, and the like, and the CPU executes programs stored in the ROM to achieve various kinds of functions of the radiation detection device 1 including the processing unit 51 and the estimation unit 52. The processing unit 51 may be included in the radiation detector 10.

The estimation unit 52 may include an estimation model 52a for estimating the source location from the acquisition result of the intensity distribution. The estimation model 52a is a model preliminarily generated through a machine learning based on training data in which the intensity distribution acquired for each incidence angle of the radiation to the detecting element group 11 (that is, each radiation incident the direction) is associated with the source location at the acquisition of the intensity distribution.

The method of the machine learning may be unfolding, neural network, or the like. The unfolding is an inverse calculation method often used in the technical field of radiation detection.

Here, the following formula (1) can be assumed to be satisfied with a matrix R as a response function of the radiation detector 10, a matrix W as a weighting function as a target to be obtained, and a matrix S as an acquisition result of the intensity distribution.

$$S = RW \qquad (1)$$

Since the response function R is generally a non-normal matrix, an inverse matrix cannot be defined. Therefore, a weighting function W to minimize an objective function σ indicated in the following formula (2) is searched. In this embodiment, the matrix S corresponds to the intensity distribution of the radiation flux as the acquisition result. The matrix R corresponds to a pattern of the radiation flux intensity of each incidence angle of the radiation. The matrix W corresponds to the intensity of each incidence angle.

$$\sigma = (S - RW)^2 \qquad (2)$$

Thus, the radiation detection device 1 can estimate the radiation source location using the radiation intensity distribution that differs corresponding to the radiation incident direction in the detecting element group 11. Therefore, regardless of the simple configuration of the radiation detector 10, the radiation source location can be estimated in all directions. Further, the radiation detection device 1 can accurately estimate the radiation source location by the use of the estimation model 52*a* generated through the machine learning regardless of the simple configuration of the radiation detector 10.

Figure 3:
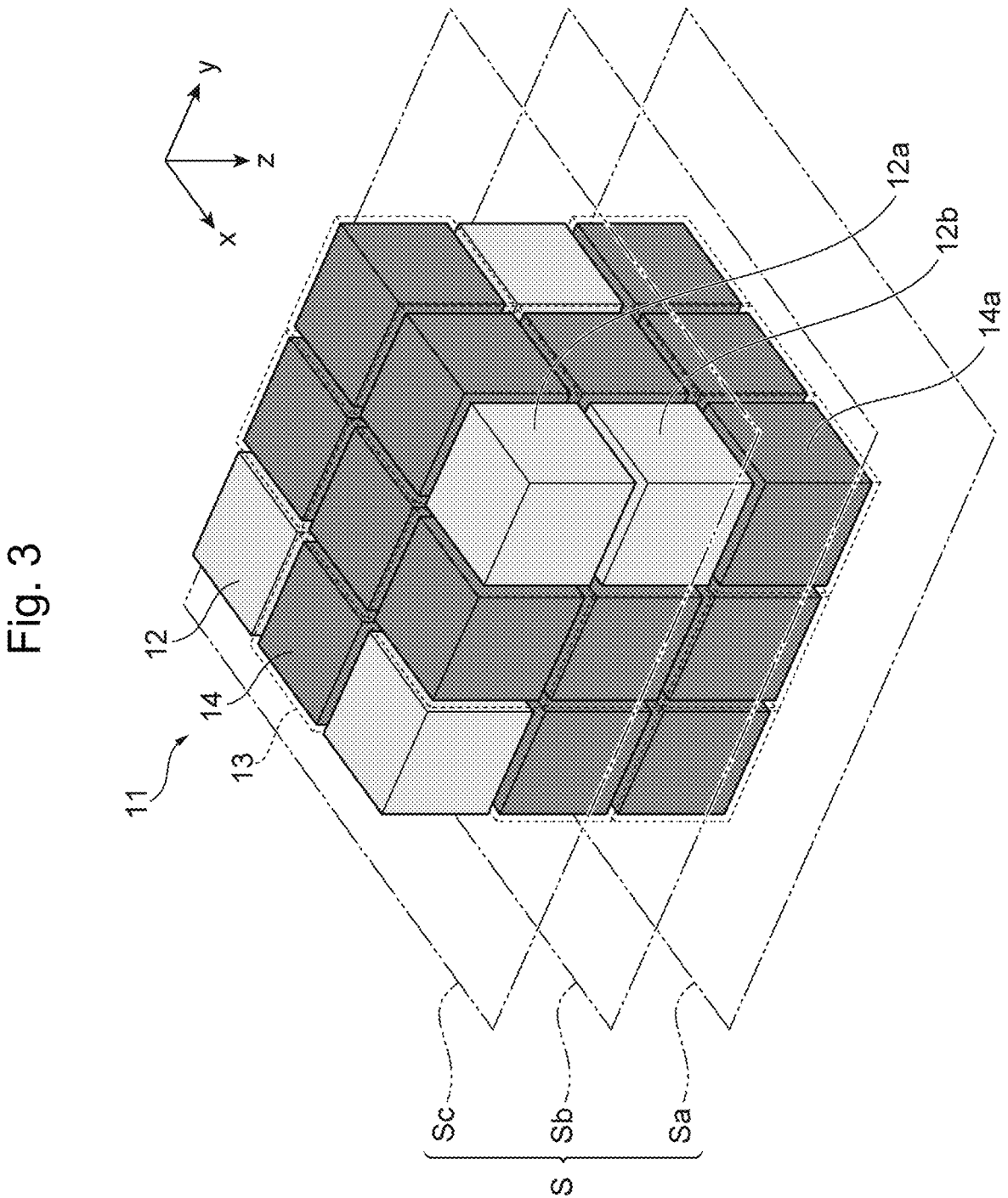
FIG. 3 is a diagram describing a structure of the detecting element group in which shielding members are provided at depletions illustrated in FIG. 2.
Figure 4:
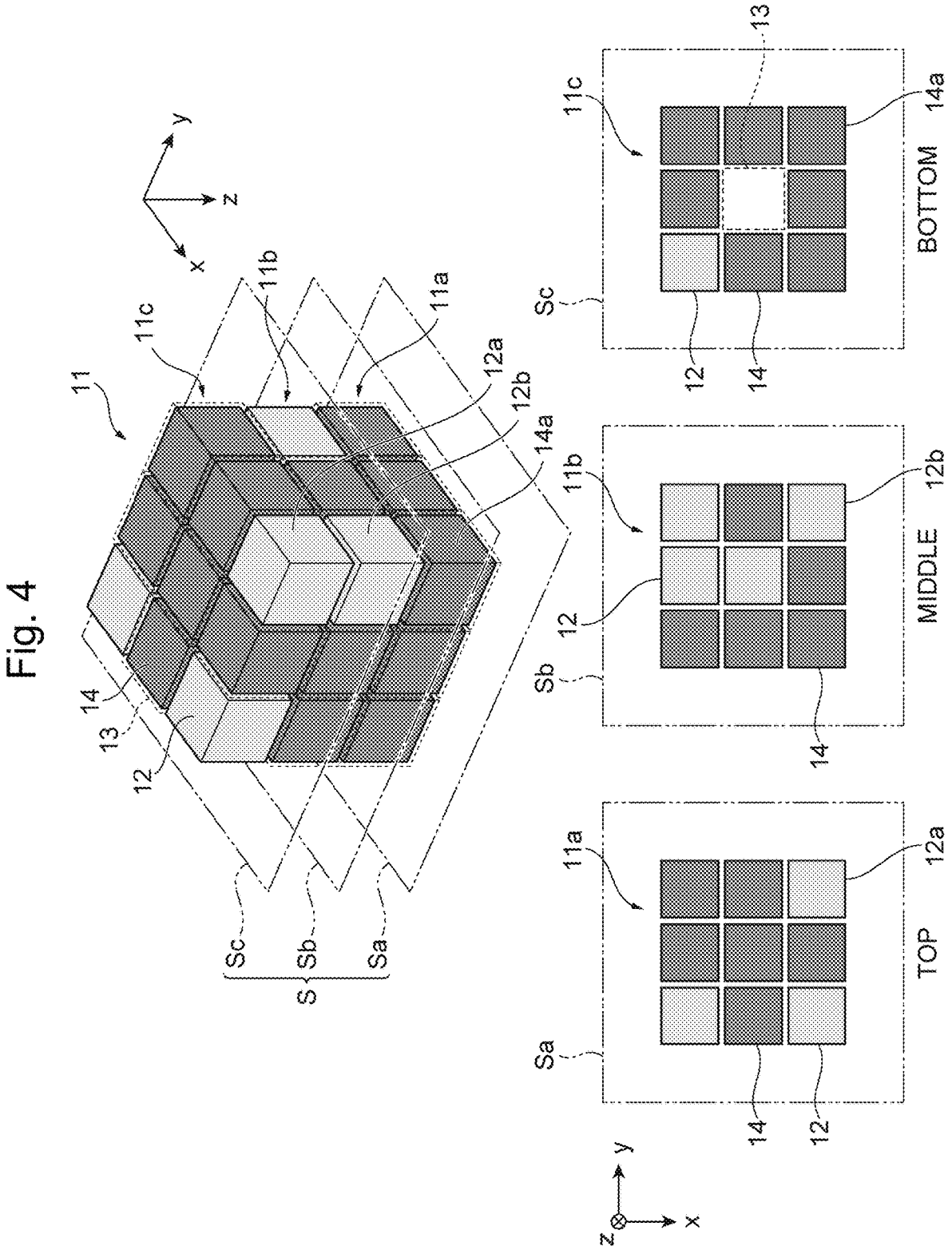
FIG. 4 is a diagram describing a detailed structure of the detecting element group illustrated in FIG. 3.

FIG. 3 is a diagram describing a structure of the detecting element group 11 in which shielding members 14 are provided at the depletions 13 illustrated in FIG. 2. FIG. 4 is a diagram describing a detailed structure of the detecting element group 11 illustrated in FIG. 3.

As illustrated in FIG. 3 and FIG. 4, the depletion 13 may be provided with the shielding member 14 that shields against the radiation. The shielding member 14 does not need to be provided to every depletion 13, and can be appropriately provided depending on the energy range or a dose rate of the radiation as a detection target. That is, at least a part of the depletions 13 (at least one depletion 13) may be provided with the shielding member 14. The shielding member 14 may be formed in a cubic shape similar to the detecting element 12. When the radiation as the detection target is a neutron ray, the shielding member 14 is preferably made of water, boron, or the like as a light element material. When the radiation as the detection target is highly penetrating radiation, such as a gamma ray or an X-ray, the shielding member 14 is preferably made of lead, tungsten, or the like as a heavy element material. That is, for the arrangement, the shape, and the selection of material of the shielding member 14, the change of design can be appropriately made in terms of actively generating the inclination of radiation flux intensity that differs corresponding to the radiation incident direction in the detecting element group 11.

For the volume or the density of the detecting element 12, the change of design can be appropriately made as well. For example, by changing the design to make a difference in volume or density between the one detecting element 12*a* and the other detecting element 12*b* in the radiation incident direction, the inclination of the radiation flux intensity can be actively generated in the detecting element group 11. For the type of the detecting element 12, the change of design can be appropriately made as well. For example, by changing the design to make a difference in radiation detection sensitivity between the one detecting element 12*a* and the other detecting element 12*b*, for example, having the one detecting element 12*a* as a beta-ray detecting element and the other detecting element 12*b* as an alpha-ray detecting element, the inclination of radiation flux intensity can be actively generated in the detecting element group 11.

With the shielding member 14 provided to the depletion 13, the radiation detection device 1 can increase the difference of the detected values between the plurality of detecting elements 12 in the detecting element group 11. This allows the radiation detection device 1 to give the difference increased corresponding to the radiation incident direction to the radiation intensity distribution in the detecting element group 11 acquired from the respective detected values of the plurality of detecting elements 12. Accordingly, the radiation detection device 1 can accurately estimate the radiation incident direction, and can accurately estimate the radiation source location. Especially, in a high-dose field, such as an inside of the building of Fukushima Daiichi Nuclear Power Plant, not only the signal detection rate of the detecting element 12 is too high to keep up the process (causes piling up), but also the radiation passing through the detecting element 12 does not allow the generation of the inclination of the radiation flux intensity in the detecting element group 11, and therefore, the radiation intensity distribution in the detecting element group 11 cannot be accurately acquired in some cases. With the shielding member 14 provided at the depletion 13, the radiation detection device 1 can accurately acquire the intensity distribution even in the high-dose field, and can accurately estimate the radiation source location.

When the shielding member 14 is not provided at the depletion 13, since the number of radiation rays entering the respective plurality of detecting elements 12 increases, the count number of photons can be increased in the whole detecting element group 11. This allows the radiation detection device 1 to significantly improve the detection efficiency of radiation compared with the case where the shielding member 14 is provided at the depletion 13. The improved detection efficiency leads to a reduction in measurement time. Since the reduction in measurement time allows reducing a dosage of radiopharmaceutical agent when the radiation detection device 1 is installed in medical equipment for radiation therapy, an effect of reducing radiation exposure of a patient can be provided. Accordingly, the radiation detection device 1 in which the shielding member 14 is not provided at the depletion 13 is effective when the radiation detection device 1 is installed in the medical equipment for radiation therapy or the like that requires the measurement time reduction.

In the detecting element group 11 illustrated in FIG. 3 and FIG. 4, the virtual surface S includes a first virtual flat surface Sa, a second virtual flat surface Sb, and a third virtual flat surface Sc. The second virtual flat surface Sb is arranged to be opposed to the first virtual flat surface Sa. The third virtual flat surface Sc is arranged to be opposed to the second virtual flat surface Sb.

In the example of FIG. 3 and FIG. 4, the first virtual flat surface Sa is an outer surface in the bottom side along the xy-plane. In the example of FIG. 3 and FIG. 4, the second virtual flat surface Sb is a plane intersecting with the solid forming the outer shape of the detecting element group 11, and is a plane passing between the detecting element 12b and a shielding member 14a. In the example of FIG. 3 and FIG. 4, the third virtual flat surface Sc is a plane intersecting with the solid forming the outer shape of the detecting element group 11, and is a plane passing between the detecting element 12a and the detecting element 12b.

In the example of FIG. 3 and FIG. 4, the first virtual flat surface Sa, the second virtual flat surface Sb, and the third virtual flat surface Sc are defined to be stacked in a normal direction of the xy-plane based on a plane along the xy-plane. However, the first virtual flat surface Sa, the second virtual flat surface Sb, and the third virtual flat surface Sc may be defined to be not only stacked in the normal direction of the xy-plane, but also stacked in normal directions of an xz-plane and a yz-plane based on planes along the xz-plane and the yz-plane. Thus, the virtual surface S of the detecting element group 11 illustrated in FIG. 3 and FIG. 4 can be appropriately defined insofar as it is an outer surface of the solid forming the outer shape of the detecting element group 11 or a plane intersecting with the solid. The number of the virtual surfaces S can also be appropriately defined.

The detecting element group 11 illustrated in FIG. 3 and FIG. 4 includes a first detecting element group 11a in which the detecting element 12 and the depletion 13 or the shielding member 14 are arranged on the first virtual flat surface Sa, a second detecting element group 11b in which the detecting element 12 and the depletion 13 or the shielding member 14 are arranged on the second virtual flat surface Sb, and a third detecting element group 11c in which the detecting element 12 and the depletion 13 or the shielding member 14 are arranged on the third virtual flat surface Sc.

This allows the radiation detection device 1 to easily achieve the three-dimensional arrangement of the detecting element 12, and to have the outer shape of the detecting element group 11 in a relatively simple polyhedron. Therefore, the radiation detection device 1 can avoid having the outer shape of the detecting element group 11 in a partially projecting shape. Accordingly, the radiation detection device 1 can be downsized with the radiation detector 10 that can be reduced in space.

Further, in the detecting element group 11 illustrated in FIG. 3 and FIG. 4, the first virtual flat surface Sa, the second virtual flat surface Sb, and the third virtual flat surface Sc are arranged to be approximately mutually parallel. The first virtual flat surface Sa, the second virtual flat surface Sb, and the third virtual flat surface Sc are mutually arranged at regular intervals. The first virtual flat surface Sa, the second virtual flat surface Sb, and the third virtual flat surface Sc mutually have approximately the same square shape.

This allows the radiation detection device 1 to further easily achieve the three-dimensional arrangement of the detecting elements 12, and to have the outer shape of the detecting element group 11 in a simple cube. Accordingly, the radiation detection device 1 can be further downsized with the radiation detector 10 that can be further reduced in space.

Furthermore, in the detecting element group 11 illustrated in FIG. 3 and FIG. 4, at least one detecting element 12 in the first detecting element group 11a, at least one detecting element 12 in the second detecting element group 11b, and at least one detecting element 12 in the third detecting element group 11c are arranged at mutually different positions viewed in the normal direction of the first virtual flat surface Sa, the second virtual flat surface Sb, and the third virtual flat surface Sc.

This allows the radiation detection device 1 to reliably increase the difference of the detected values between the plurality of detecting elements 12 for the radiation having the direction perpendicular to the normal direction as the incident direction. Accordingly, the radiation detection device 1 can accurately estimate the source location of the radiation entering from the direction along the first virtual flat surface Sa, the second virtual flat surface Sb, and the third virtual flat surface Sc.

At least one detecting element 12 in the first detecting element group 11a, at least one detecting element 12 in the second detecting element group 11b, and at least one detecting element 12 in the third detecting element group 11c are preferably arranged at mutually different positions viewed in not only the normal direction of the xy-plane, but also the normal directions of the xz-plane and the normal direction of the yz-plane.

This allows the radiation detection device 1 to reliably increase the difference of the detected values between the plurality of detecting elements 12 for each of the radiations having the directions perpendicular to the respective normal directions as the incident directions. Accordingly, the radiation detection device 1 can further accurately estimate the source location of the radiation entering from all directions.

Figure 5:
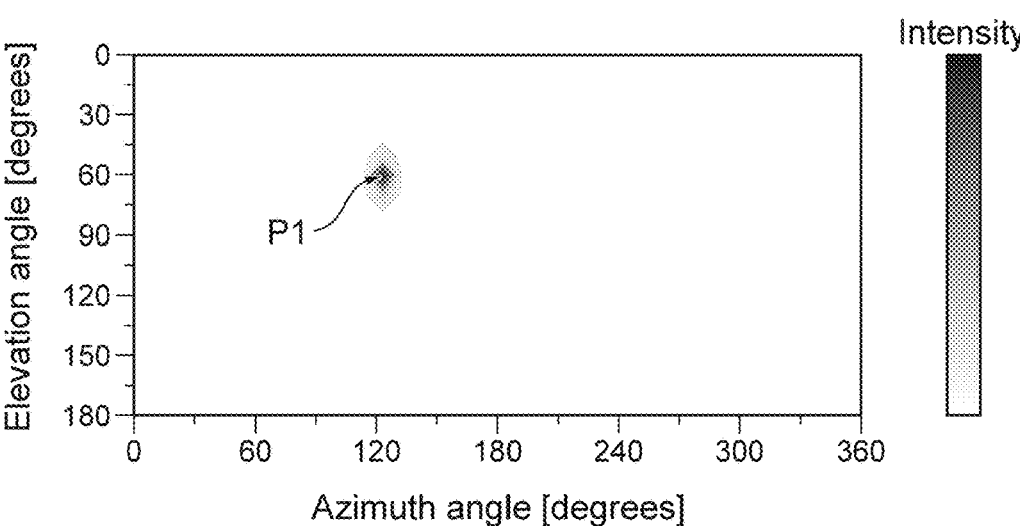
FIG. 5 is a diagram illustrating simulation results of estimation of a source location by the radiation detection device including the detecting element group illustrated in FIG. 3 and FIG. 4.
Figure 5:
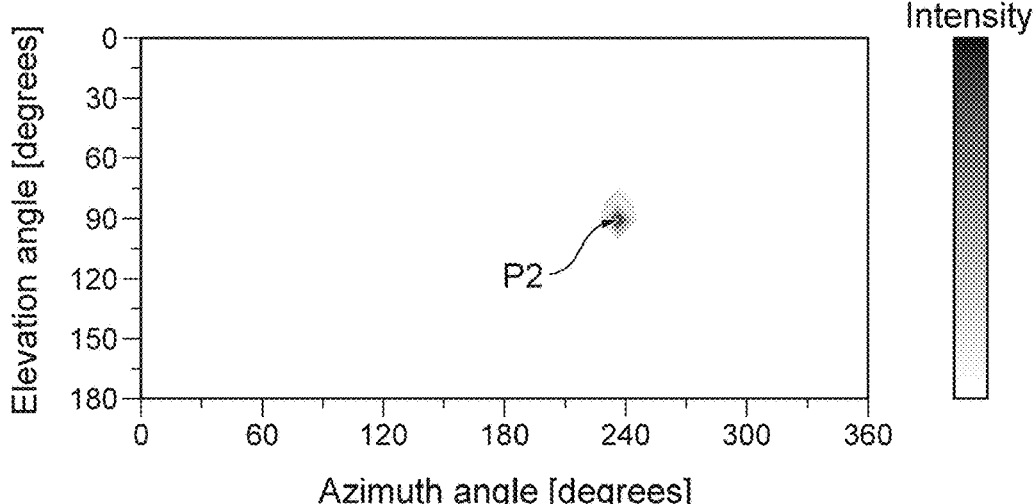
Figure 5:
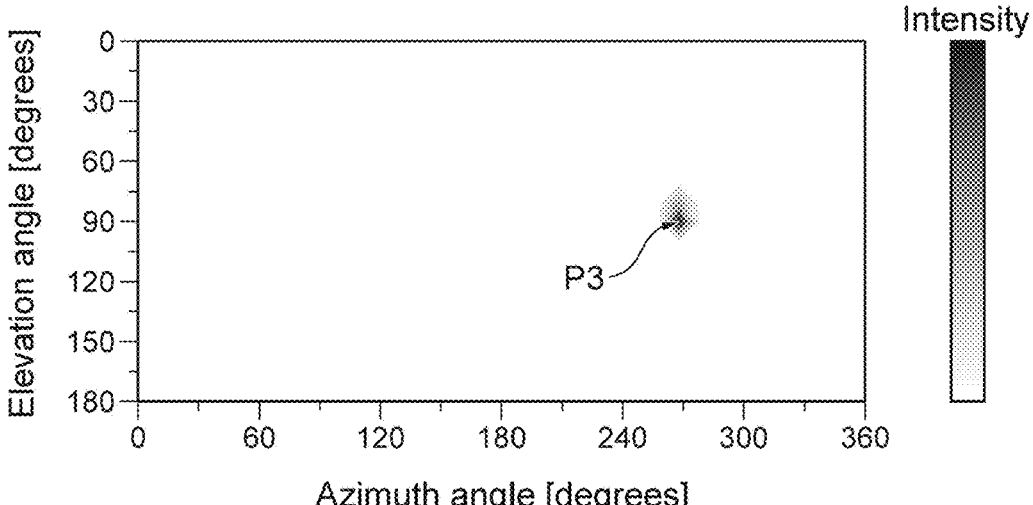

FIG. 5 is a diagram illustrating simulation results of estimation of the source location by the radiation detection device 1 including the detecting element group 11 illustrated in FIG. 3 and FIG. 4.

First, simulation conditions will be described. Conditions regarding geometry of the detecting element group 11 are as follows. That is, the shape and the size of each of the detecting element 12, the depletion 13, and the shielding member 14 was a cube of 10 mm×10 mm×10 mm. As the detecting elements 12, eight GAGG (Gadolinium Aluminum Gallium Garnet) scintillators were disposed. As the shielding members 14, 18 lead blocks were disposed. One depletion 13 was provided. The arrangement of the detecting elements 12, the depletion 13, and the shielding members 14 was as illustrated in FIG. 4.

Conditions regarding imaging of the source location are as follows. That is, the method of machine learning for generating the estimation model 52a was a neural network (one hidden layer). As training data, a gamma ray of 662 keV was irradiated on the detecting element group 11 for each of the incidence angles at every 10 degrees in both an azimuth angle $\varphi$ and an elevation angle $\theta$. For each of the incidence angles, the radiation irradiation for 10 minutes was performed 10 times. The count number of photons of the detecting element 12 was measured for the radiation entered in the detecting element group 11 from the respective incidence angles.

Conditions regarding test data are as follows. That is, the radiation source was $^{137}$Cs (10 MBq). The number of photons was 102,708. The number of photons corresponds to the irradiation with a gamma ray from a source location apart from the detecting element group 11 by 3 m for 10 minutes. As the source location of the radiation, three patterns of P1 to P3 were prepared.

Next, the simulation result will be described. The horizontal axis of FIG. 5 indicates the azimuth angle $\varphi$ of the incidence angle of the radiation, and the vertical axis of FIG. 5 indicates the elevation angle $\theta$ of the incidence angle of the radiation. In FIG. 5, the darker the color mapped as the simulation result is, the higher the intensity of the detected radiation is, and it is indicated that the presence probability of the source location is high. In FIG. 5, tips of arrows P1 to P3 indicate true source locations. As illustrated in FIG. 5, it is seen that in each of the three patterns P1 to P3, the true source location can be reproduced in the simulation result. Therefore, from the simulation result illustrated in FIG. 5, it is seen that the radiation detection device 1 can accurately estimate the source location of the radiation.

Figure 6:
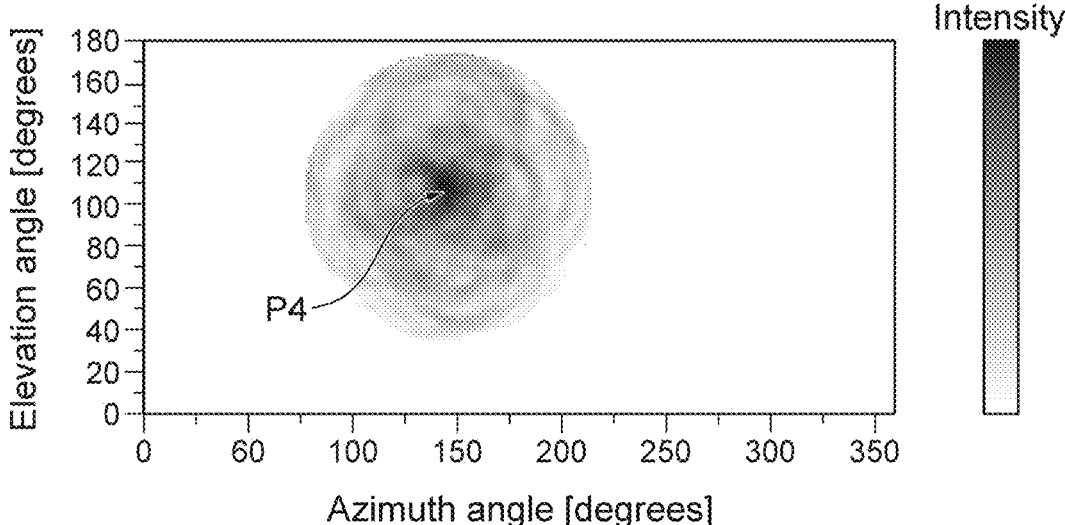
FIG. 6 is a diagram illustrating a result of estimation of a source location by a conventional radiation detection device.

FIG. 6 is a diagram illustrating a result of estimation of a source location by a conventional radiation detection device.

First, measurement conditions will be described. In this measurement, a Compton camera (manufacturer: Chiyoda Technol Corporation, product name: GAMMA Catcher) was used as a conventional radiation detection device. The radiation source was $^{137}$Cs (10 MBq). The gamma ray was emitted from a source location apart from the Compton camera by 8 m for one hour.

Next, the estimation result of the source location will be described. The horizontal axis of FIG. 6 indicates the azimuth angle φ of the incidence angle of the radiation, and the vertical axis of FIG. 6 indicates the elevation angle θ of the incidence angle of the radiation. While the actual visual field of the conventional radiation detection device is in an angle range of ±70° from the center of the camera, it is converted into a visual field of 4π sr in FIG. 6 for facilitating the comparison with FIG. 5. In FIG. 6, the tip of an arrow P4 indicates a true source location.

As illustrated in FIG. 6, according to the conventional radiation detection device, it is seen that extra images appear in addition to the true source location. This is because the Compton camera images one Compton cone for one detection, and images a position at which the most Compton cones overlap as a position at which the presence probability of the source location is the highest after acquiring a large number of events. Therefore, according to the conventional radiation detection device, innumerable Compton cones appear, and they possibly become noise components in the estimation of the source location. Meanwhile, in the simulation result illustrated in FIG. 5, the noise component as illustrated in FIG. 6 is reduced, and it is seen that the radiation detection device 1 of the embodiment can accurately estimate the source location of the radiation.

Figure 7:
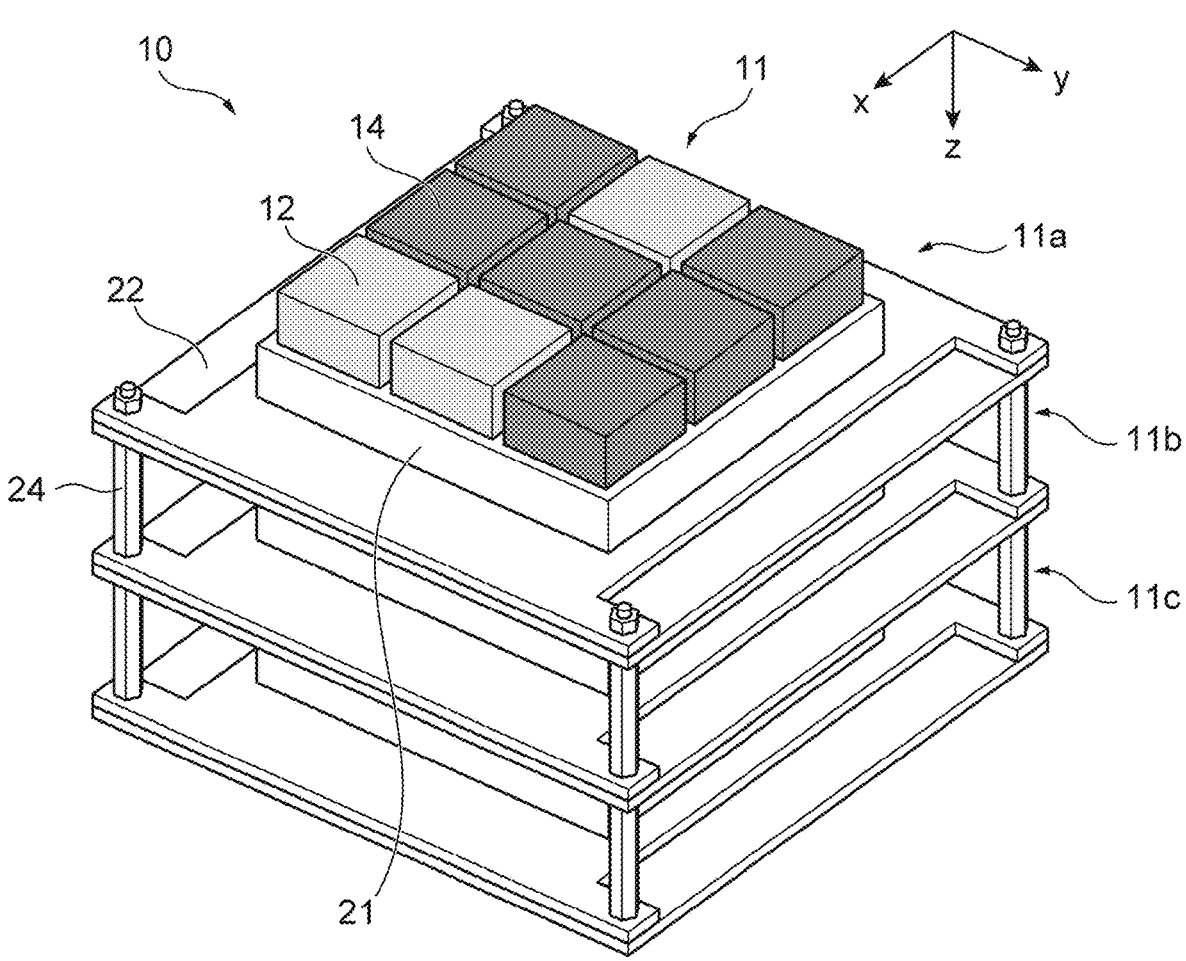
FIG. 7 is a perspective view illustrating an example of a radiation detector.
Figure 8:
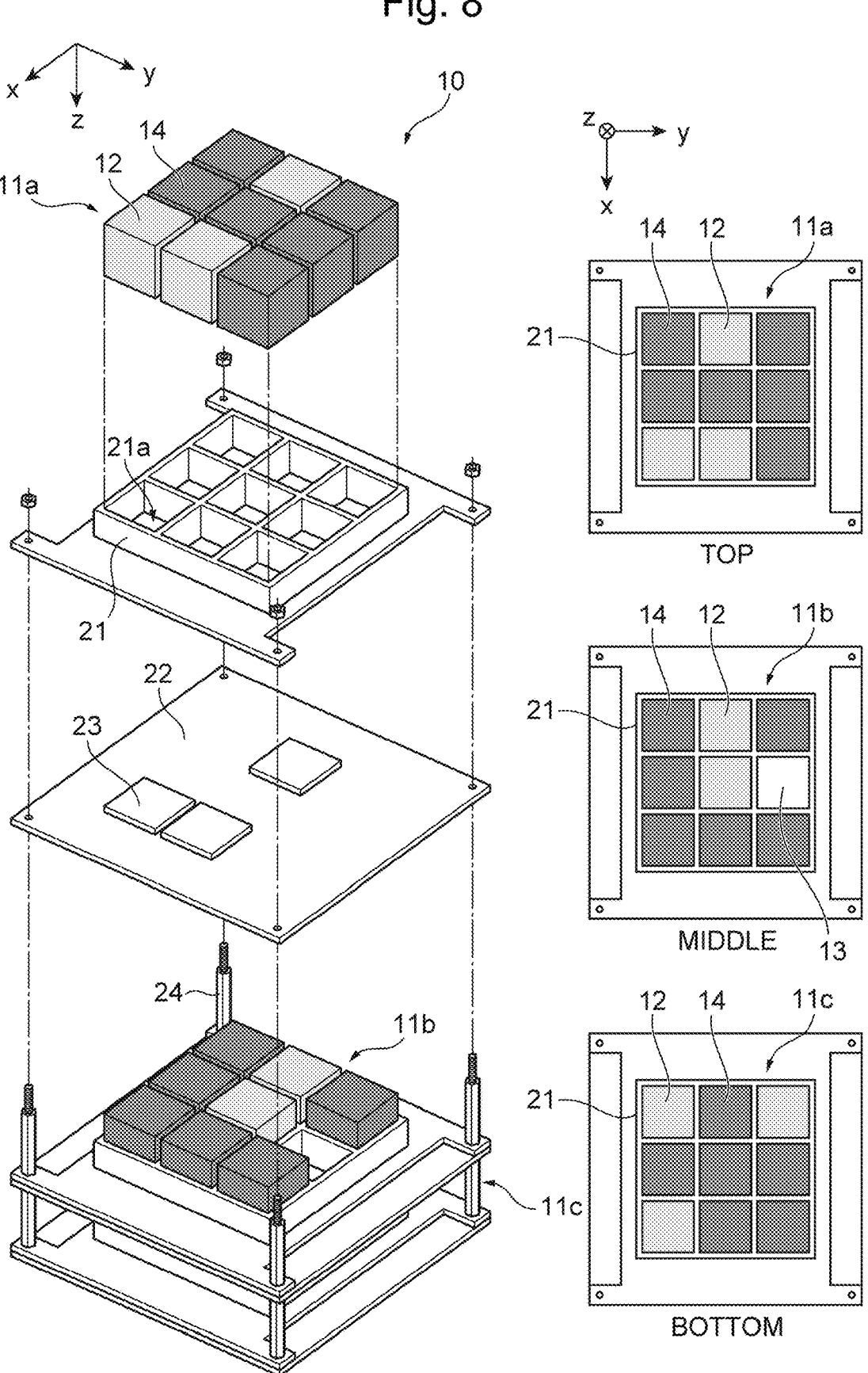
FIG. 8 is an exploded perspective view of the radiation detector illustrated in FIG. 7.

FIG. 7 is a perspective view illustrating an example of the radiation detector 10. FIG. 8 is an exploded perspective view of the radiation detector 10 illustrated in FIG. 7.

The radiation detector 10 illustrated in FIG. 7 and FIG. 8 includes a detecting element group 11, a holder 21 that holds the detecting element group 11, and a circuit board 22 that performs signal processing of the detecting element 12 to acquire the detected value.

The detecting element group 11 illustrated in FIG. 7 and FIG. 8 has a multi-layer structure similar to the detecting element group 11 illustrated in FIG. 3 and FIG. 4, and includes a first detecting element group 11a, a second detecting element group 11b, and a third detecting element group 11c. The first detecting element group 11a, the second detecting element group 11b, and the third detecting element group 11c each have an outer shape formed in a square flat plate shape, and are stacked along a normal direction of the xy-plane.

The holder 21 and the circuit board 22 are provided for each of the first to the third detecting element groups 11a to 11c. The holder 21 holds the detecting element 12 and the shielding member 14. At least the portion holding the detecting element 12 of the holder 21 is provided with a light transmitting portion 21a, such as a hole through which a light emitted from the detecting element 12 as a scintillator passes. The holder 21 is disposed to be opposed to the circuit board 22, and secured by screws or the like. The circuit board 22 includes silicon photomultipliers (SiPMs) 23 that detect and amplify the light emission of the detecting elements 12. The SiPM 23 is disposed at a position at least corresponding to the detecting element 12 on a mounting surface of the circuit board 22. The circuit board 22 includes various kinds of electronic components necessary for acquiring the detected value of the detecting element 12 in addition to the SiPM 23.

When the SiPMs 23 are disposed in all regions of the circuit board 22 opposed to the light transmitting portion 21a, the type, the arrangement, or the like of the detecting elements 12 appropriate for the measurement environment can be changed as necessary. This allows, for example, the improvement of detection efficiency of the radiation when the radiation detection device 1 is installed in the medical equipment for radiation therapy. Therefore, the radiation detection device 1 can easily change the design, for example, change the volume or the density of the detecting element 12, or change the detecting element 12 to one having good radiation detection sensitivity.

The holder 21 and the circuit board 22 corresponding to the first detecting element group 11a, the holder 21 and the circuit board 22 corresponding to the second detecting element group 11b, and the holder 21 and the circuit board 22 corresponding to the third detecting element group 11c are disposed mutually at intervals via spacers 24.

Figure 9:
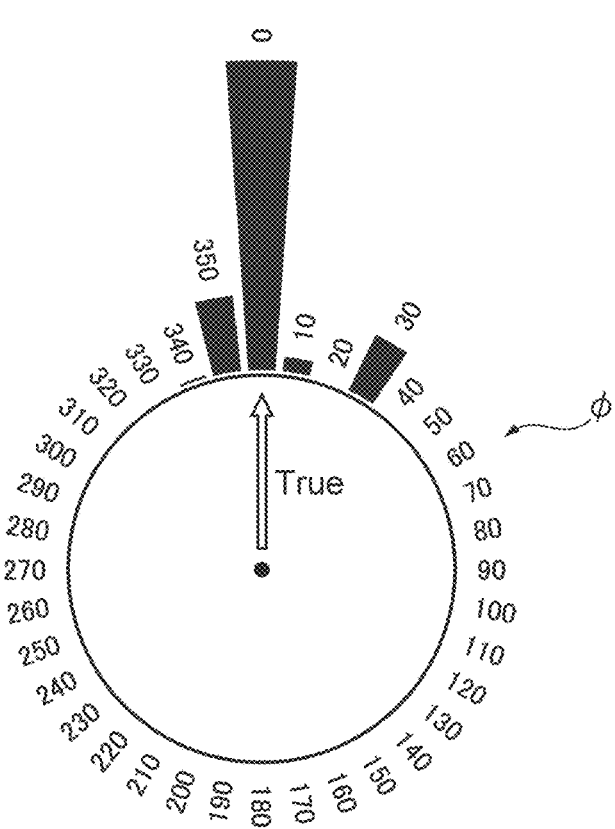
FIG. 9 is a diagram illustrating experimental results of an estimation of the source location by the radiation detector illustrated in FIG. 7 and FIG. 8.
Figure 9:
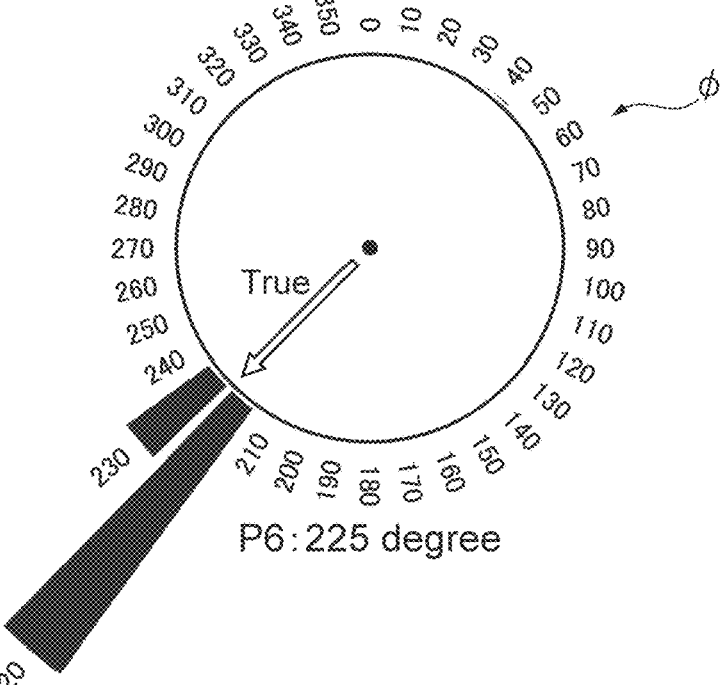

FIG. 9 is a diagram illustrating experimental results of an estimation of the source location by the radiation detector 10 illustrated in FIG. 7 and FIG. 8.

First, experimental conditions will be described. Conditions regarding geometry of the detecting element group 11 are as follows. That is, the shape and the size of each of the detecting element 12, the depletion 13, and the shielding member 14 was a cube of 10 mm×10 mm×10 mm. As the detecting elements 12, eight GAGG scintillators were disposed. As the shielding members 14, 18 lead blocks were disposed. One depletion 13 was provided. The arrangement of the detecting elements 12, the depletion 13, and the shielding members 14 was as illustrated in FIG. 8.

As a condition regarding imaging of the source location, a response function under the condition of irradiating the detecting element group 11 with a gamma ray for each of incidence angles at every 10 degrees in the azimuth angle φ (0 degrees to 350 degrees) was prepared.

Conditions regarding test data are as follows: the radiation source was $^{137}$Cs (10 MBq). A gamma ray was emitted from a source location apart from the radiation detector 10 by 152.4 mm (6 inch) for three minutes. As the source location of the radiation, two patterns of P5 and P6 were prepared. The radiation source and the radiation detector 10 were placed on the same table, and only the azimuth angle φ of the incidence angle of the radiation was varied.

Next, the experimental result will be described. The center of the circle illustrated in FIG. 9 indicates the position of the radiation detector 10. Numerical values in the circumferential direction of the circle illustrated in FIG. 9 indicate the azimuth angle φ. In FIG. 9, the longer the length of the black bar chart mapped as the experimental result is, the higher the intensity of the detected radiation is, and it is indicated that the presence probability of the source location is high. In FIG. 9, the azimuth angle φ of the true source location of P5 is 0 degrees, and the azimuth angle φ of the true source location of P6 is 225 degrees. As illustrated in FIG. 9, it is seen that in both of the two patterns P5 and P6, the true source location can be mostly reproduced in the experimental result. Therefore, from the experimental result illustrated in FIG. 9, it is seen that the radiation detection device 1 can accurately estimate the source location of the radiation.

Figure 10:
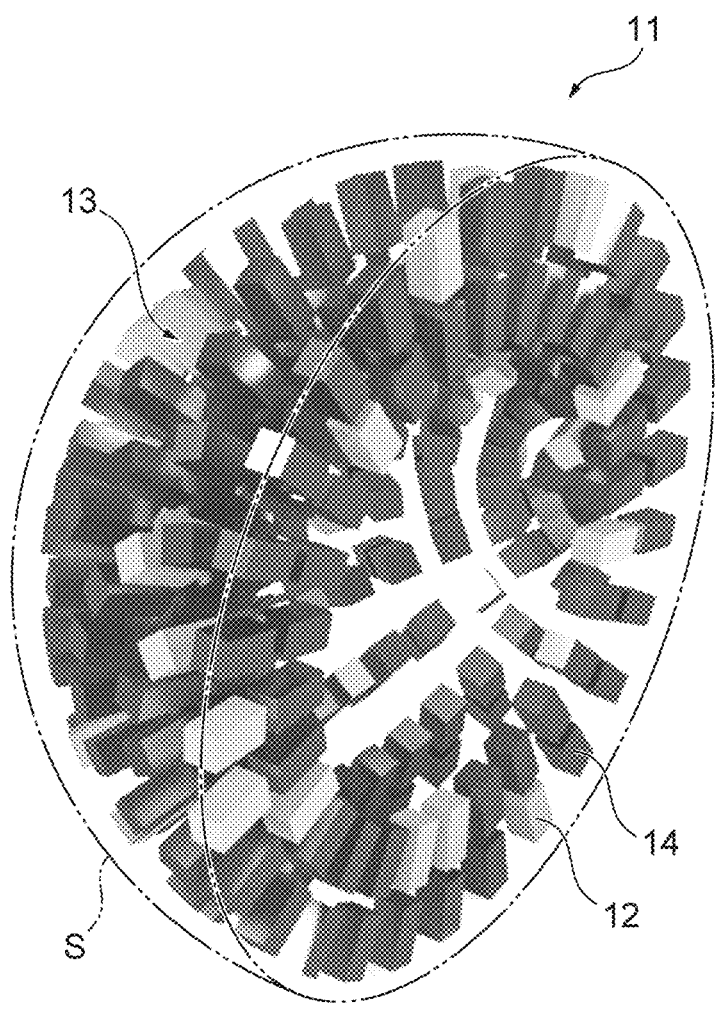
FIG. 10 is a diagram describing an example of another structure of the detecting element group.
Figure 11:
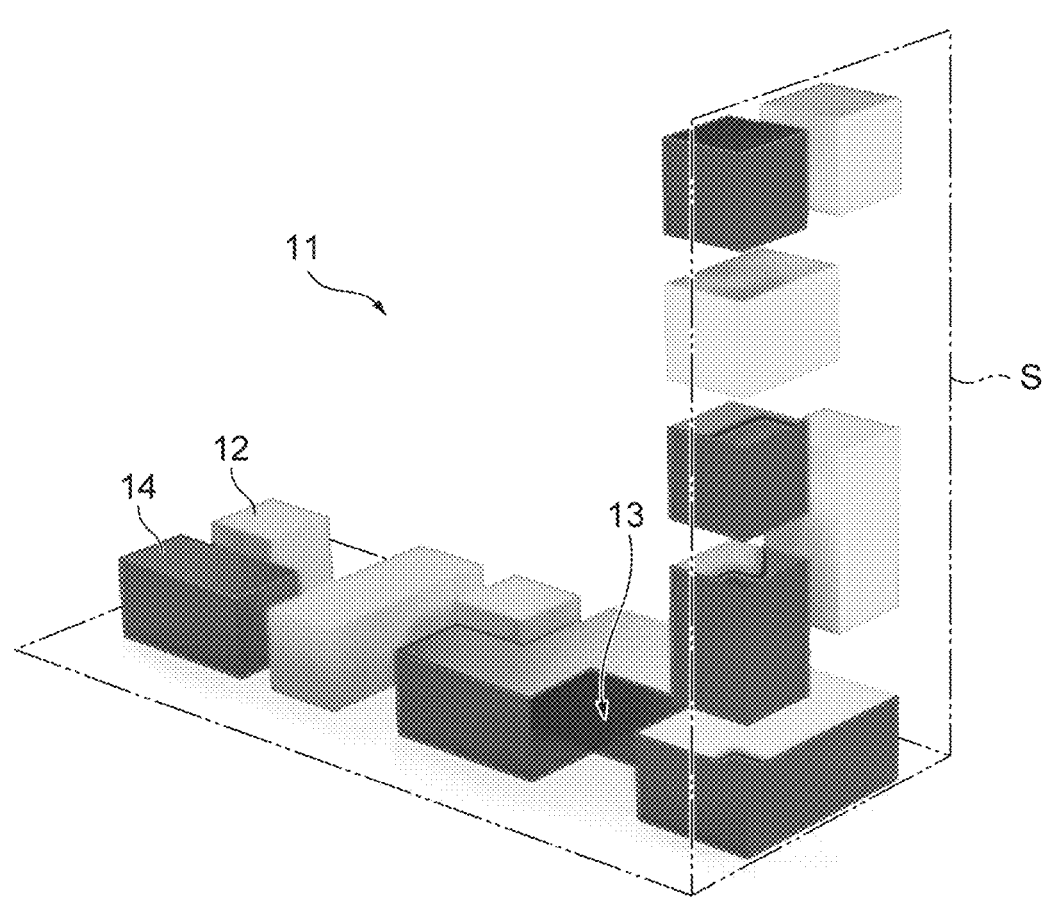
FIG. 11 is a diagram describing an example of another structure of the detecting element group.
Figure 12:
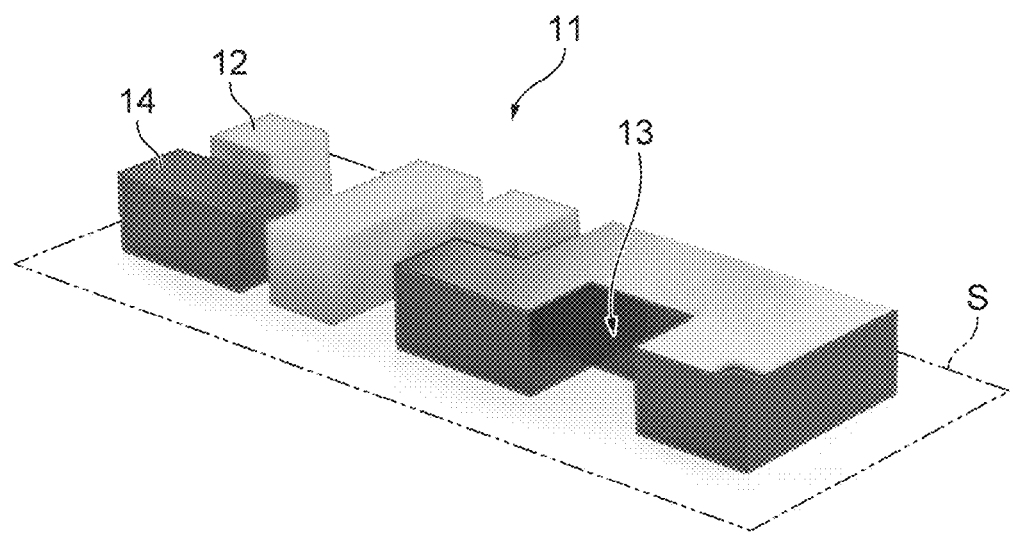
FIG. 12 is a diagram describing an example of another structure of the detecting element group.

FIG. 10 is a diagram describing an example of another structure of the detecting element group 11. FIG. 11 is a diagram describing an example of another structure of the detecting element group 11. FIG. 12 is a diagram describing an example of another structure of the detecting element group 11.

In the above-described embodiment, as illustrated in FIG. 3 and FIG. 4, the detecting element group 11 is formed in a cubic shape having a multi-layer structure in which the first detecting element group 11*a* to the third detecting element group 11*c* are stacked. However, the shape and the structure of the detecting element group 11 may have any shape and structure insofar as the intensity distribution of the radiation in the detecting element group 11 is uniquely determined by the source location.

For example, as illustrated in FIG. 10, the detecting element group 11 may be formed in a hemispherical shell shape having a hollow structure. The virtual surface S of the detecting element group 11 illustrated in FIG. 10 includes a virtual curved surface in a shape of hemisphere surface. Accordingly, the radiation detection device 1 eliminates the need for providing the multi-layer structure to the detecting element group 11 when $2\pi$ sr is enough for the required visual field. Therefore, the number of components can be reduced, thus allowing the cost reduction and the weight reduction.

For example, as illustrated in FIG. 11, the detecting element group 11 may be formed in an L plate shape. The virtual surface S of the detecting element group 11 illustrated in FIG. 11 includes a virtual bending surface bent in an L shape. Accordingly, the radiation detection device 1 eliminates the need for providing the multi-layer structure to the detecting element group 11 when the incident direction of the radiation is limited to a specific direction. Therefore, the number of components can be reduced, thus allowing the cost reduction and the weight reduction.

In the above-described embodiment, the plurality of detecting elements 12 constituting the detecting element group 11 are three-dimensionally arranged. However, when the incident direction of the radiation is limited to a specific direction, the plurality of detecting elements 12 constituting the detecting element group 11 may be two-dimensionally arranged as illustrated in FIG. 12. Therefore, in the radiation detection device 1, the number of components can be further reduced, thus allowing the further cost reduction and the further weight reduction.

As described above, the radiation detection device 1 of this embodiment is a radiation detection device that includes the detecting element group 11 in which the plurality of detecting elements 12 that detect radiation are three-dimensionally arranged. The structure of the detecting element group 11 is a structure provided with the depletion 13 formed by removing the detecting element 12 at any position from the virtual detecting element group in which the detecting elements 12 are laid out on any virtual surface S. The depletion 13 is provided at a position at which a difference of detected values between one detecting element 12*a* and the other detecting element 12*b* arranged along any direction exhibits different values in a case where the radiation having the direction as the incident direction enters and a case where the radiation having an opposite direction of the direction as the incident direction enters.

This allows the radiation detection device 1 of the embodiment to provide mainly four advantages below, which are not provided by the conventional radiation detection device.

The first advantage is that the radiation detection device 1 has the visual field in all directions. Since the intensity distribution of the radiation generated in the detecting element group 11 includes the contribution of the radiation entering from all directions, by acquiring the intensity distribution, the radiation detection device 1 can perform the imaging in all directions by the single measurement.

The second advantage is that the radiation detection device 1 has wide application ranges of the energy and the dose rate of the radiation. In the case of a Compton camera, the energy of photon as the detection target is limited to an energy range having Compton scattering as a main interaction. In the case of a coded mask type camera, since the coded mask has a limitation in shielding ability, the imaging accuracy for the photon having high energy significantly decreases. Additionally, since the Compton camera requires coincidence with the signals of the multiple detecting elements, the signal processing circuit for acquiring the detected value is complicated, and the application to the high-dose field having the high detection rate is difficult. In contrast, the radiation detection device 1 is applicable to various types of the radiation by selecting the respective types, the arrangement, or the like of the detecting element 12, the depletion 13, and the shielding member 14 appropriate for the photon energy as the target. Additionally, by appropriately selecting the respective sizes and numbers of the detecting elements 12, the depletions 13, and the shielding members 14, the radiation detection device 1 is applicable to from the low-dose field, such as an outdoor environment, to the ultra-high dose field, such as an inside of a nuclear reactor.

The third advantage is that the device configuration is simple, and the size and weight can be reduced. In the case of a pinhole camera, to shield against entering of the radiation from a position other than the pinhole, the whole detector needs to be covered with a thick shield. This makes the total weight of the pinhole camera tens of kilograms or more. Meanwhile, the radiation detection device 1 does not need to include the shielding member 14 insofar as the depletion 13 as described above is provided. Even when the shielding member 14 is used, the radiation detection device 1 only needs to include the shielding member 14 that at least generates the inclination of the radiation flux intensity in the detecting element group 11 regarding the photon of the energy of radiation as the target. Therefore, in the radiation detection device 1, even when the shielding member 14 is used, the weight of the radiation detector 10 can be suppressed to from several hundred grams to several kilograms or less. The weight of this degree allows the radiation detection device 1 to be easily mounted to a compact robot or a drone, thus greatly expanding the range of applications. Further, also in the application to an artificial satellite or the like where the weight of detector is considerably important, the radiation detection device 1 is extremely advantageous. Moreover, in the radiation detection device 1, since several number of the detecting elements 12 are sufficient, the device configuration is simple, and the signal processing circuit for acquiring the detected value of the detecting element 12 only needs to be simple as well. The radiation detection device 1 can be manufactured at low price.

The fourth advantage is that the detecting element group 11 can employ any shape and structure. Usually, the gamma-ray imager has the visual field, the detection efficiency, and the spatial resolution that significantly vary depending on the shape and the structure of the detector, and therefore, the common shape and structure cannot be largely changed. In contrast, the radiation detection device 1 estimates the source location of the radiation from the intensity distribution of the radiation in the detecting element group 11. Therefore, the detecting element group 11 may have any shape and structure insofar as the intensity distribution is uniquely determined by the source location. This advantage is effective when the installation site of the radiation detection device 1 is limited.

Thus, this embodiment can provide the novel radiation detection device 1 that is wide in visual field, wide in application range of radiation energy, and at the same time smaller and lighter in weight.

While the embodiment of the present invention is described above in detail, the present invention is not limited to the above-described embodiment, and various changes can be made without departing from the spirit of the present invention described in the claims. In the present invention, a configuration of one embodiment can be added to a configuration of another embodiment, a configuration of one embodiment can be replaced with a configuration of another embodiment, and a part of configurations of one embodiment can be deleted.

DESCRIPTION OF SYMBOLS

1 Radiation detection device
10 Radiation detector
11 Detecting element group
11*a* First detecting element group
11*b* Second detecting element group
11*c* Third detecting element group
12 Detecting element
12*a* One detecting element
12*b* Other detecting element
13 Depletion
14 Shielding member
50 Arithmetic processing unit
51 Processing unit
52 Estimation unit
52*a* Estimation model
S Virtual surface
Sa First virtual flat surface
Sb Second virtual flat surface
Sc Third virtual flat surface

What is claimed is:
1. A radiation detection device comprising:
a detecting element group in which a plurality of detecting elements that detect radiation are three-dimensionally arranged,
wherein the detecting element group has a structure provided with a depletion formed by removing the detecting element at any position from a virtual detecting element group in which the detecting elements are laid out on any virtual surface, wherein the virtual surface includes a first virtual surface and a second virtual surface, the second virtual surface being opposed to the first virtual surface,
wherein the detecting element group includes a first detecting element group arranged on the first virtual surface and a second detecting element group arranged on the second virtual surface, and
wherein the first detecting element group and the second detecting element group include respective first detecting elements arranged at mutually different positions viewed in a normal direction of the first virtual surface and the second virtual surface, and at least a second detecting element of the first detecting element group is arranged in a same position in the normal direction as another detecting element of the second detecting element group.

2. The radiation detection device according to claim 1, wherein at least a part of the depletions is provided with a shielding member that shields against the radiation.

3. The radiation detection device according to claim 1, wherein the first virtual flat surface and the second virtual surface are arranged to be approximately mutually parallel; and wherein the first virtual surface and the second virtual surface mutually have approximately a same square shape.

4. The radiation detection device according to claim 1, wherein one of the first virtual surface and the second virtual surface includes a virtual curved surface in a shape of a hemisphere surface.

5. The radiation detection device according to claim 1, further comprising an arithmetic processing unit, wherein the arithmetic processing unit includes a hardware processor that acquires a spatial intensity distribution of the radiation in the detecting element group based on respective detected values of the plurality of detecting elements and estimates a source location of the radiation based on an acquisition result of the intensity distribution.

6. The radiation detection device according to claim 5, wherein the hardware processor uses an estimation model that estimates the source location from the acquisition result of the intensity distribution, and wherein the estimation model is a model preliminarily generated through a machine learning based on training data in which the intensity distribution acquired for each incidence angle of the radiation to the detecting element group is associated with the source location at the acquisition of the intensity distribution.

7. The radiation detection device according to claim 1, wherein the first virtual surface and the second virtual surface are flat surfaces.

8. The radiation detection device according to claim 1, wherein the virtual surface further includes a third virtual surface opposed to the second virtual surface, the detecting element group includes a third detecting element group in which the detecting element and the depletion are arranged on the third virtual surface, and at least a first one of the detecting elements in the third detecting element group, the at least a first one of the detecting elements in the first detecting element group, and the at least the first one of the detecting elements in the second detecting element group are arranged at mutually different positions viewed in the normal direction.

* * * * *